Feb. 27, 1968 D. M. TAUB 3,371,323

BALANCED CAPACITIVE READ ONLY MEMORY

Filed June 20, 1963 5 Sheets-Sheet 1

INVENTOR
DANIEL M. TAUB
BY Carl C. Kling
ATTORNEY

United States Patent Office 3,371,323

Patented Feb. 27, 1968

3,371,323

BALANCED CAPACITIVE READ ONLY MEMORY

Daniel Matthew Taub, Winchester, England, assignor to International Business Machines Corporation, New York, N.Y., a corporation of New York Filed June 20, 1963, Ser. No. 289,282
Claims priority, application Great Britain, Sept. 4, 1962, 33,825/62
11 Claims. (Cl. 340—173)

ABSTRACT OF THE DISCLOSURE

Read only matrix memory having selective coupling between input lines and output lines such that energizing a particular input line produces data signifying signals on the output lines. The selective coupling is either capacitive or has significant incidental capacitance. Output lines are formed in pairs that balance the capacitive load on each input line. Each input line is paired with a balancing line that equalizes the capacitive load on the output line pairs and also balances the effects of capacitive coupling between unselected input lines and the output lines in systems in which the input lines are arranged in a selection matrix.

The invention relates to memory arrays, and more particularly to permanent storage arrays for digital computers.

A memory array according to the invention permanently and repetitively provides a particular group of output signals in response to a particular selecting signal. The basic arrangement is a matrix of selecting drive conductors and sense conductors arranged at right angles to define at the crossover points individual storage areas. Selected storage locations are provided with patterns of closed loop coupling conductors adapted to experience circulating currents upon energization of the associated drive conductors. These circulating currents are effective to develop output currents in the associated sense conductors. The coupling conductors are preferably preformed patterns of a non-magnetic conductive metal such as copper. A particularly convenient arrangement of the coupling conductor patterns is such that whenever a binary 1 is preformed current is induced in the associated sense conductor in one direction and whenever a binary 0 is preformed current is induced in the associated sense conductor in the opposite direction.

ENVIRONMENT OF THE INVENTION

Permanent storage arrays using ferrite cores as coupling elements have been used to provide control signals for computers. Such core control arrays or control matrices provide extremely powerful means of controlling the computer. The function of the control matrix is to generate sequences of control words, each word comprising a fixed pattern of binary digits with each of which is associated a particular gating function. The sequences are generated by energizing selected rows of the matrix in succession. These rows are selectively coupled to different column sense wires by ferrite cores, the number of column sense wires being the same as the number of digits in each pattern. Such a matrix is known as a "read-only" matrix, since the information it contains is determined by the disposition of the coupling elements (i.e. the cores) and new information cannot be written in without removing or adding cores. It is with the read-only type of array that this invention is primarily concerned.

The use of ferrite cores involves a number of disadvantages, for example, no satisfactory method of selectively winding cores automatically has yet been devised and all but the simplest matrices must still be wound by hand. In addition, once a matrix has been wound, it is extremely difficult if not impossible to change the pattern of cores. Other types of read-only memories are known including capacitive read-only memories, in which the presence or absence of a capacitor at a particular intersection conveys the information, diode read-only memories in which the presence or absence of a diode at a particular intersection conveys the information; and flux controlling read-only memories in which the presence or absence of a non-magnetic coupling conductor at the intersection conveys information.

CHARACTERISTICS OF THE INVENTION

The basic characteristic of the invention is the permanent storage of information at intersections of drive conductors and sense conductors in a matrix by distinctively different patterns of non-magnetic conductive closed loop coupling material for each of the signals to be stored.

*Objects*

It is an object of the present invention to provide an improved read-only memory.

*Features*

A feature of the invention is a memory array comprising a number of sense conductors arranged in columns crossing these rows substantially at right angles so as to define a number of storage areas in the region where the conductors cross. Selected storage locations are provided with a first pattern of closed loop coupling conductors adapted to experience a first type of circulating current upon energization of an associated drive conductor and selected other storage locations are provided with a second pattern of closed loop coupling conductors adapted to experience a second type of circulating current upon energization of an associated drive conductor. These currents are effective to develop respectively first and second distinguishable output currents in the associated sense conductors.

Another feature of the invention is the printing of drive and sense conductors in a pattern on a first sheet of insulating material and printing of the coupling conductors on a further sheet of insulating material which may be brought into close contact with the first sheet without allowing the coupling conductors to come into contact with the drive and sense conductors. The material of the conductors is preferably copper and the coupling conductors are preferably in the form of thin rectangular sheets.

Another feature of the invention is the provision for altering the contents of the array of changing the printed pattern on the second insulating sheet.

Another feature of the invention is the increasing of signal by directing flux through the storage locations by applying magnetically permeable material to one or both surfaces of the array.

Another feature of the invention is the increasing of signal by providing coupling conductor patterns with unbalanced capacitive configurations so that the unbalanced capacitive coupling can enhance the signal.

Another feature of the invention is the provision of balanced drive lines in a read-only matrix.

Another feature of the invention is the provision for a ternary system by third patterns of coupling conductors.

*Advantages*

An advantage of the invention is the inherent balance that is provided by the presence of a pattern (either 1 or 0 or in a ternary system, −1) at each intersection in a binary read-only memory.

Another advantage is the ease by which a new control pattern may be substituted for the old control pattern by the replacement of the coupling conductor sheet, without interfering with any of the electrical connections.

*Summary*

The invention relates to a permanent storage array or read-only memory. The basic format is the familiar matrix of rows and columns of mutually insulated conductors, which form intersections at which the bit storage elements are located.

The bit storage elements take the form of patterns of material in thin sheet form arranged about an intersection to provide a signal demonstrative of the pattern and thus indicative of the bit value assigned to the pattern.

For a simple binary system, a single pattern for the 1 bit value and a no-pattern for the 0 bit value suffice. A more sophisticated version is a first pattern for the 1 and a second pattern for the 0. These patterns may be the "cross" and the "naught." Ternary memory operation requires an extra pattern discernible from the binary patterns, which pattern may be termed the "null" pattern.

Since speed of operation and cost are important considerations in read-only memories, and speed is in many cases limited by inductances, capacitive treatment and balanced drives of the bit patterns may be used.

The foregoing and other objects, features and advantages of the invention will be apparent from the following more particular description of preferred embodiments of the invention, as illustrated in the accompanying drawings.

*Figures*

*Naughts and crosses—FIGURES 1–5*

Figure 1:
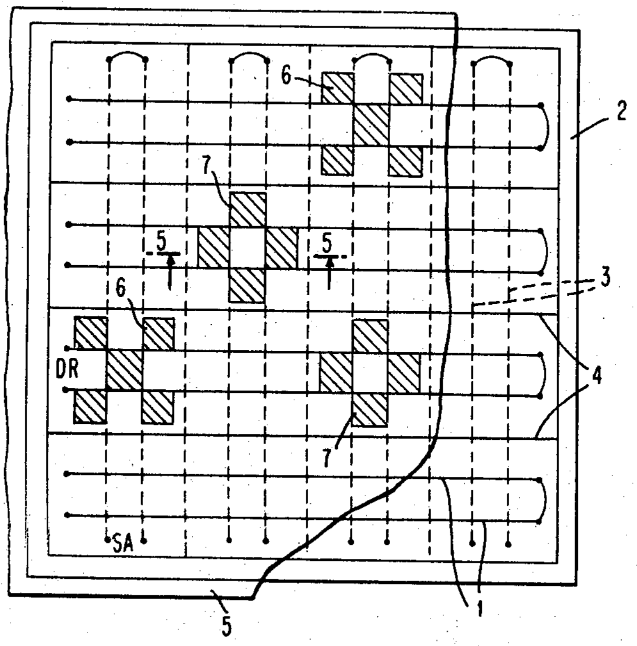
FIGURE 1 is a diagram of a first embodiment of the invention.

FIGURE 1 shows a read-only memory configuration. The read-only memory includes a group of drive conductor pairs such as 1 arrayed on one side of an insulating sheet 2. The other side of sheet 2 carries sense conductor pairs such as 3 which are substantially at right angles to the drive conductors to form a matrix. The sense conductors and drive conductors are looped back so that they form a railroad track intersection defining a unit or bit storage area. Each bit storage area includes a 3 x 3 matrix of essentially square areas. Insulating sheet 2 is preferably of resin bonded paper .008 inch thick although satisfactory results are given by sheets of .002 inch in thickness. The drive conductors such as 1 and sense conductors such as 3 are preferably printed. Also printed on both sides of insulating sheet 2 is a system 4 of copper screening conductors which serve to reduce interference between adjacent bit areas.

A second insulating sheet 5 carries a pattern of coupling conductors printed upon it. The coupling conductors are so arranged that when insulating sheets 2 and 5 are brought together the coupling conductors register with selected intersections (bit areas) of the drive and sense conductors. Where a 1 is stored, the coupling conductors are arranged in a cross pattern 6. Where a 0 is stored, the coupling conductors are arranged in a naught pattern 7.

Figure 2:
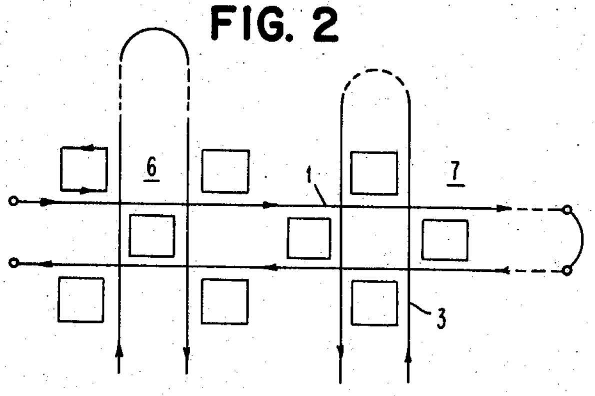
FIGURE 2 is a diagram of current paths in the embodiment of FIGURE 1.

FIGURE 2 shows in detail the arrangement of the coupling conductors for the naught and cross patterns. To store a binary 1 a coupling conductor is placed in the central area common to both sense and drive conductor pairs and four further such coductors are placed at points at diagonals radiating from the common area. This is the "cross" pattern arranged as the five spots on a domino 5 are arranged.

The simplest way of storing a 0 is to leave the bit area free from coupling conductors for as the drive and sense conductors are at right angles there can be very little mutual coupling in the absence of a coupling conductor.

An improved signal to noise ratio is obtained by the use of the "naught" configuration. The central area common to both sense and drive conductor pairs is left blank and four coupling conductors are placed immediately above, below and on either side of the common area. Operation of the device is as follows:

Current is assumed to be applied to address drive conductor 1 as shown by the arrows. A current is induced in the coupling conductors generating a field which by Lenz' Law tends to oppose the field produced by the current in address conductor 1. The direction of the current in the coupling conductor is shown by the arrows and this current in turn induces an electromotive force in the associated sense conductor which provides a 1 output. In a similar manner, the naught arrangement 7 produces a 0 output of opposite direction upon its sense conductor 3 in response to a change of current of the same polarity in address conductor 1.

Figure 3:
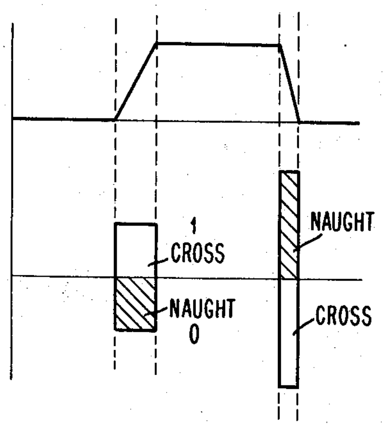
FIGURE 3 is a timing chart for the FIGURE 1 embodiment.

FIGURE 3 shows the relationship between the drive pulse (shown on the top line) the 1 output (unshaded) and the 0 output (shaded). The positive going excursion of the address drive current produces a positive pulse in the sense conductor and the subsequent negative-going change of drive produces the negative pulse. When a 0 is stored (naught) the first pulse on the sense conductor is negative (shaded) and the subsequent pulse is positive.

If it should be desired to store ternary information the three digits 1, −1 and 0 may be represented respectively by a cross pattern 6, a naught pattern 7 and no pattern, producing on the associated sense conductors a positive pulse followed by a negative pulse, a negative pulse followed by a positive pulse and no pulse, according to the digits stored.

Figure 4:
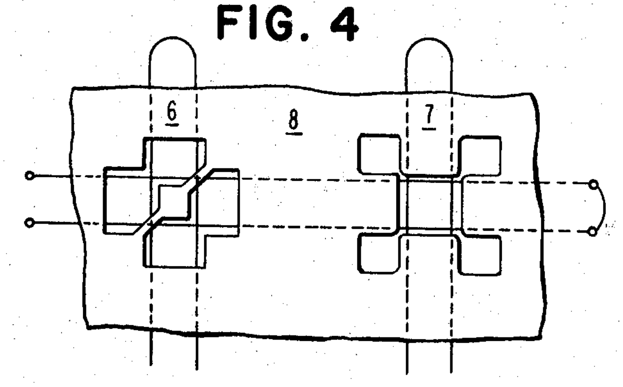
FIGURE 4 is a diagrammatic plan view showing cutout patterns of the coupling conductor in relationship with the drive and sense conductors.

FIGURE 4 shows the patterns of the coupling conductors which may take the form of closed printed conductors. The structure shown lends itself readily to manufacture, since the insulating sheet may initially be provided with a conducting, e.g. copper sheet, backing, the positions in the sheet not requiring coupling conductors being subsequently punched out. Cross pattern 6 and naught pattern 7 are shown punched out of sheet 8.

Figure 5:
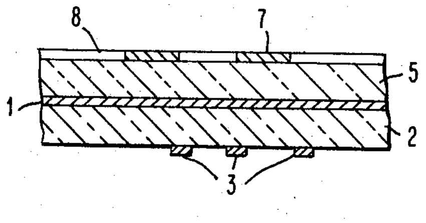
FIGURE 5 is a section elevation view taken along line 5—5 of FIGURE 1.

FIGURE 5 shows such an arrangement, a sandwich construction including the information-carrying copper sheet 8 on its insulating backing 5 and insulating sheet 2 carrying the drive and sense conductors 1 and 3. An additional advantage of this form of construction is that the information carrying sheet, being a conductor, serves to reduce the inductance of the drive and sense wires and thus permits faster operation.

Figure 5A:
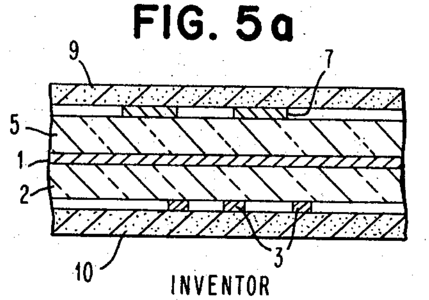
FIGURE 5*a* is a similar view of a special ferrite-shielded sandwich structure.

FIGURE 5*a* shows a modification of FIGURE 5. It will be noted from the foregoing description that since the array of drive conductors is arranged on one side only of the coupling conductors, a certain amount of flux developed upon energization of the drive conductors does not pass through the storage locations. In certain applications where it is necessary to have a high output signal, the provision of a block of magnetically permeable material such as ferrite material on one or both surfaces of the array produces a magnification of the output signal in the region of 8 to 10 times. The sandwich construction 1, 2, 3, 5, 7 of FIGURE 5 is held together by two ferrite blocks 9 and 10.

*Balanced ternary system—FIGURE 6*

One method of storing ternary information, e.g. 1, —1 and 0, is by using two complementary patterns of coupling conductors to represent 1 and —1 and no pattern to represent 0.

The coupling conductors can either be printed or bonded on an insulating sheet or formed in a continuous sheet of copper by punching out the desired pattern; a 0 can be stored by omitting coupling conductors at any one location with the first arrangement and by a continuous conductor, i.e. not punching holes at any one location with the second arrangement. However, both arrangements suffer from the disadvantage that the impedance between the terminals of a drive and a sense conductor depends on the information stored. In the balanced ternary embodiment a memory array comprises a plurality of drive conductors arranged in rows, a plurality of sense conductors crossing the rows to define storage location and groups of conducting elements disposed at each storage location, the elements in a group being arranged in one of at least three alternative patterns each pattern representing a stored bit of information. The number and arrangement of elements in each group is such that the coupling between a group and the sense (or drive) conductor associated with that group introduces a similar impedance between the ends of the sense (or drive) conductor.

One pattern of elements may cause an electromotive force in one direction in the sense conductor associated therewith when the associated drive conductor is pulsed; the second pattern of elements may cause an electromotive force in the opposite direction in the sense conductor associated therewith when the associated drive conductor is pulsed; the third pattern of elements may cause no electromotive force in the sense conductor associated therewith when the associated drive conductor is pulsed.

Figure 7:
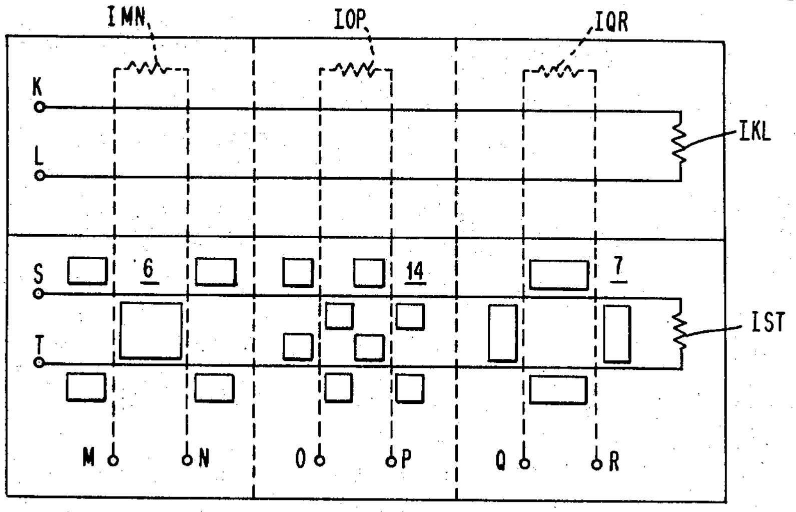
FIGURE 7 is a diagram of a ternary system including signals 0, −1 and 1 which are developed by three patterns including a "null" pattern.
Figure 8A:
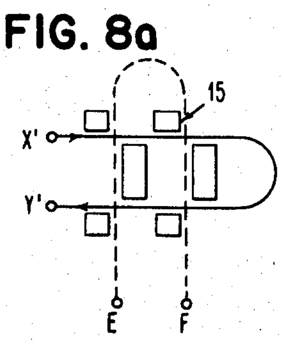
FIGURE 8 illustrates the pattern layout (8*a*), current paths (8*b*) and physical pattern (8*c*) of second form of null signal pattern.
Figure 8B:
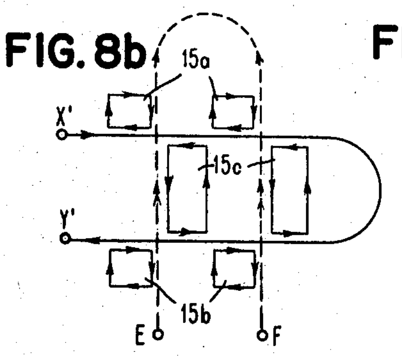

Conveniently each drive and sense conductor may comprise two parallel elements interconnected at one end through an impedance such as substantially to prevent reflection of high frequency signals, i.e. the characteristic impedance. FIGURES 6 and 8 present two patterns of coupling conductors each of which have the conductor elements so arranged as to produce a zero net electromotive force in the sense conductors in response to a current pulse flowing in the drive conductors. The conductor elements are arranged in patterns such that an electromotive force induced in the sense conductor by one set of conductor elements in response to a current pulse flowing in the drive conductors is canceled by an electromotive force induced in the sense conductors by another set of conductor elements whereby a null (no pulse signal) is induced in the associated sense conductor. FIGURES 6, 8 and 9 illustrate three types of null producing patterns. FIGURE 7 shows the use of the null producing pattern with the naught and cross pattern to provide a balanced ternary system.

Figure 6A:
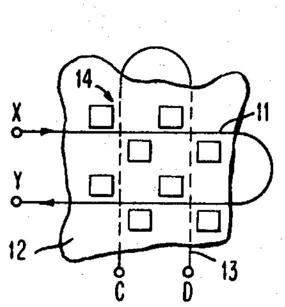
FIGURE 6 illustrates a cutout pattern (6*a*), current paths (6*b*) and elevation view of a physical cutout pattern (6*c*) giving rise to a null signal.

The memory bit storage area of FIGURE 6*a* includes address drive conductor 11 printed upon insulating sheet 12 at right angles to and insulated by sheet 12 from sense conductors 13. One conductor of each pair of drive and sense conductors is respectively connected to the other conductor of the pair.

Each conductor of the pair of drive conductors 11 will couple capacitively with each conductor of the pair of sense conductors 13, where the conductors cross. Because of the symmetry of the arrangement, however, the capacitance is equal. Thus the capacitance between drive conductor X and sense conductor C is equal to the capacitance between drive conductor X and sense conductor D and similarly the capacitance between conductor Y and conductor C is equal to the capacitance between conductor Y and conductor D. The capacitance coupling therefore produces substantially no signal between the sense conductor terminals CD when a current flows in the drive conductors 11. Also printed on both sides of the sheet may be a system of copper screening conductors which serve to restrict interference or interaction between adjacent crossover points. These conductors (4) are shown in FIGURE 1 and may be dispensed with if desired.

Address drive conductors 11 are coupled by a multiplicity of coupling elements 14 disposed adjacent each position at which drive conductors XY cross sense conductors CD. Conductor elements 14 are complementary in that they each have the same surface area and one element is disposed in the second and forth quadrants respectively or each of the four crossover regions of the drive conductors XY and sense conductors CD respectively.

Figure 6B:
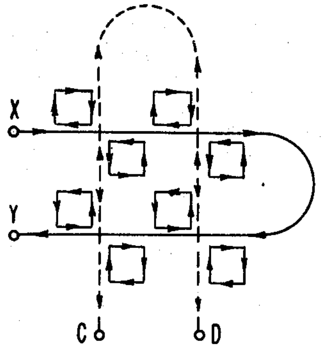

Assume a current pulse flows in drive conductors XY in the direction of the arrows (FIGURE 6*b*). Current is produced in each conductor element 14 generating a flux which by Lenz' law tends to oppose the field produced in the drive conductors. The direction of the current in the conductor elements 14 is shown by arrows and this current in turn induces electromotive forces in the sense conductor CD as shown by the arrows. Thus the electromotive force induced in one direction in the sense conductor CD by the conductor elements 14 adjacent to drive conductor X is canceled by an electromotive force induced in the other direction in the sense conductor CD by the conductor elements 14 adjacent drive conductor Y. This results in the 0 net electromotive force in the sense conductor CD.

Figure 6C:
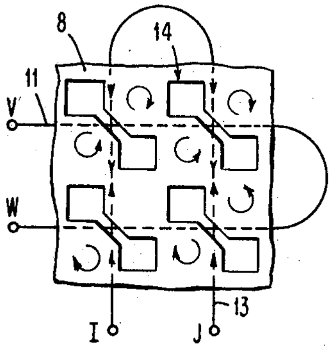

FIGURE 6*c* shows a pattern of holes to be punched out of a continuous sheet of copper 8. The holes are disposed to leave conductive material elements 14 adjacent to the drive conductors and sense conductors 11 and 13. A current pulse in drive conductors XY in the direction of the arrows induces in conductors CD signals which cancel one another for a null.

FIGURE 7 illustrates the arrangement of crosses, null patterns and naughts to provide a balanced ternary system. Cross pattern 6 provides the 1 signal. Naught pattern 7 provides the —1 signal and null pattern 14 provides the 0 signal. A matrix of drive conductors KL and ST with sense conductors MN, OP and QR is provided. A positive going change is produced in a drive current in drive conductors ST. Coupling conductors 6 produce a positive pulse in sense conductors MN followed by a negative going change. No pulse (null) is registered in sense conductors OP due to the arrangement of the conductor elements 14 and a negative going followed by a positive going pulse is produced in sense conductors QR due to the arrangement of coupling conductors 7. The arrangement of FIGURE 7 can thus be used to store ternary information, e.g., 1, −1 and 0.

The number and arrangement of the elements in the groups 6, 14 and 7 are such that the coupling between group 6 and sense conductors MN, between group 14 and sense conductors OP and between group 7 and sense conductors QR introduce respectively a similar impedance between the ends of sense conductors MN, OP and QR. The impedances $I_{MN}$, $I_{OP}$, and $I_{QR}$ are of equal value and are made equal to the characteristic impedance of the lines MN, OP and QR. Similarly the impedance $I_{KL}$, $I_{ST}$ and $I_{UV}$ are of equal value.

Coupling conductor pattern 14 may equally well be replaced by coupling conductor pattern 14*a* (shown in FIGURE 6*c*) or by the coupling conductor patterns of FIGURE 8.

FIGURE 8 shows another pattern of coupling conductors which produces a null signal. Coupling conductor elements 15 are similar to those of FIGURE 6 in that they are disposed in the second quadrant as defined by the crossover region of the drive conductors X′ with sense conductors EF respectively. Two further conductor elements 15*b* having the same surface area as element 15*a* are disposed in the third quadrant defined by the crossover regions of drive conductor Y′ with sense conductors EF respectively, and two further conductor elements 15*c* having approximately twice the surface area of elements 15*a* are disposed to extend from the fourth quadrant as defined by the crossover regions of drive conductor X′ with sense conductor E and drive conductor Y′ with sense conductor F respectively to the first quadrant as defined by the crossover regions of the drive conductor X′ with sense conductor E and drive conductor Y′ with sense conductor F respectively.

Assume a current pulse flows in drive conductors X′Y′ in the direction of the arrows. Coupling conductor pattern 15 produces a zero net electromotive force in the sense conductors EF in response to a current pulse flowing in drive conductors X′Y′. The electromotive force induced in sense conductor E via the respective element 15*a*, 15*b*, 15*c* adjacent sense conductor E is canceled by an electromotive force induced in sense conductor F via the respective conductor elements 15*a*, 15*b*, 15*c* adjacent to sense conductor F. The direction of the electromotive force and current flow is shown by the arrows.

Figure 8C:
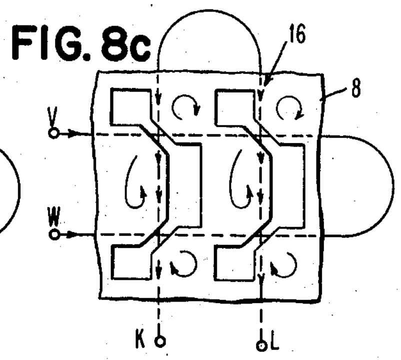
Figure 9:
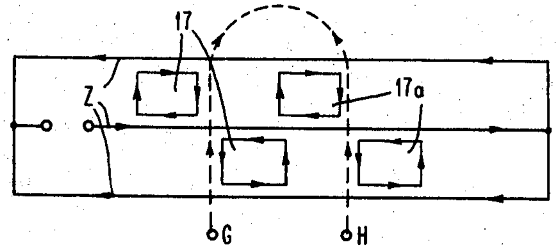
FIGURE 9 shows a further null signal pattern of conductor elements for use with an unbalanced drive conductor and balanced sense conductors.

Similar results, i.e. zero net electromotive force in the conductors, can be achieved with the pattern 16 of FIGURE 8*c*. Pattern 16 is similar to pattern 15 of FIGURES 8*a* and 8*b*. The electromotive force induced in conductor K by the coupling conductor element adjacent to crossover points of conductors V and K and W and K respectively is canceled by the electromotive force induced in conductor L by the coupling conductor element pattern adjacent to crossover points of conductors VL and WL respectively. This results in zero net electromotive force in the sense conductors KL.

Similarly in FIGURE 9 a current pulse flowing in the unbalanced drive conductor Z induces opposing canceling electromotive forces in the balanced sense conductors GH respectively, due to the arrangement of the complementary pairs of conductor elements 17, 17*a* respectively. In response to a current pulse in drive conductor Z the electromotive force induced in sense conductor G by element 17 adjacent thereto is canceled by the electromotive force induced in sense conductor H by elements 17*a* adjacent thereto, thus resulting in zero net electromotive force in the sense conductors GH.

Use of the conductor elements according to the present invention with coupling conductor configuration for ternary signals 1, −1 and 0 has the advantage that the inductance and capacitance of drive and sense conductors are the same for all conductor coupling or element patterns. Thus current flowing in the drive conductors will always produce zero net flux through the sense conductors whereby the same value of impedance can be used to terminate all the drive and sense conductors.

Although the memory arrays shown in FIGURES 1 and 7 have only three columns and two or three rows these numbers may be considerably increased. For example, a practical memory array may have fifty columns and a thousand rows.

*Unbalanced capacitive coupling—FIGURES 10–16*

The coupling conductors may be constructed and arranged to introduce an unbalanced capacitive coupling between associated drive and sense conductors. The unbalanced capacitive coupling is arranged to produce a signal in the associated sense conductor enhancing the signal produced therein by the inductive coupling.

Figure 10:
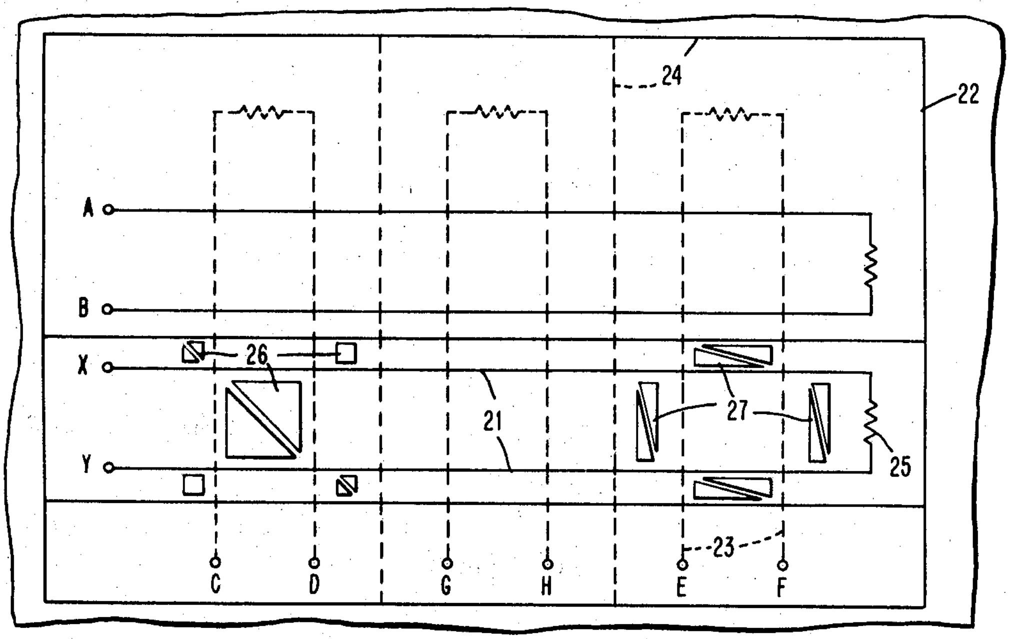
FIGURE 10 shows a second embodiment of the invention including an unbalanced capacitive coupling which enhances signals.

FIGURE 10 shows a memory array comprising a plurality of drive conductors arranged in rows, a plurality of sense conductors crossing said rows and a multiplicity of conducting elements respectively disposed at adjacent positions at which the sense and drive conductors cross to define storage locations. Some or all of the conducting elements are divided into two closely adjacent parts to introduce an unbalanced capacitive coupling between associated drive and sense conductors.

With advantage the divided conducting elements are arranged with respect to an associated drive and sense conductor so as to produce an electromotive force in the sense conductor which enhances the electromotive force produced in the sense conductor by the inductive coupling between the drive conductor, all the conducting elements and the sense conductor.

The memory array includes a first set of parallel pairs of drive (address conductors) such as 21 printed on one side of a sheet or board of electrically insulating material 22, on the other side of which is printed, also by printed circuit techniques, a second set of parallel pairs of sense conductors such as 23. The direction of the sense conductors is perpendicular to that of the drive conductors. Also printed on sheet 22 is a system of copper screening conductors 24 which serves to restrict interference or interactions between adjacent intersections. Screening conductors 24 may be dispensed with if desired. One conductor of each pair of drive and sense conductors is respectively connected to the other conductor of the pair via resistors (such as 25), in such manner that current flowing in one direction in one conductor of a pair flows in the opposite direction of the other conductor of the pair. Resistors 25 serve as terminations for the drive and sense conductors respectively to prevent reflection from the end, an important consideration at high operating frequencies.

Each conductor of a pair of drive conductors (such as 21) will couple capacitively each conductor of the pair of sense conductors (such as 23) where the conductors cross. However, because of the symmetry of the arrangement, the capacitance is equal. Thus the capacitance between drive conductor A and sense conductor C is equal to that between drive conductor A and sense conductor D and similarly that between B and C is equal to that between conductors B and D. The capacitive coupling therefore produces substantially no signal between the sense conductor terminals when a current flows in the drive conductors.

The pairs of drive and sense conductors are coupled by coupling conductor patterns 26 and 27 arranged at or around selected positions at which the drive and the sense conductors cross. One set of patterns of the coupling conductors shown in FIGURE 10 is shown in greater detail in FIGURE 11. Some or all of the conductors 26 and 27 are divided into two parts 26*a* and 26*b* and 27*a* and 27*b* respectively. For the purpose of illustration and with reference to FIGURE 11 the sides of the coupling conductors may be about 1/16 inch long and the diagonal corner to corner slot may be .01 inch wide. Although the sides of the coupling conductor are shown to be spaced from its adjacent drive and sense conductor, they do in actual practice overlap but do not extend beyond the latter. The insulating sheet 22 may be of epoxy glass .002 inch to .008 inch thick.

Figure 11:
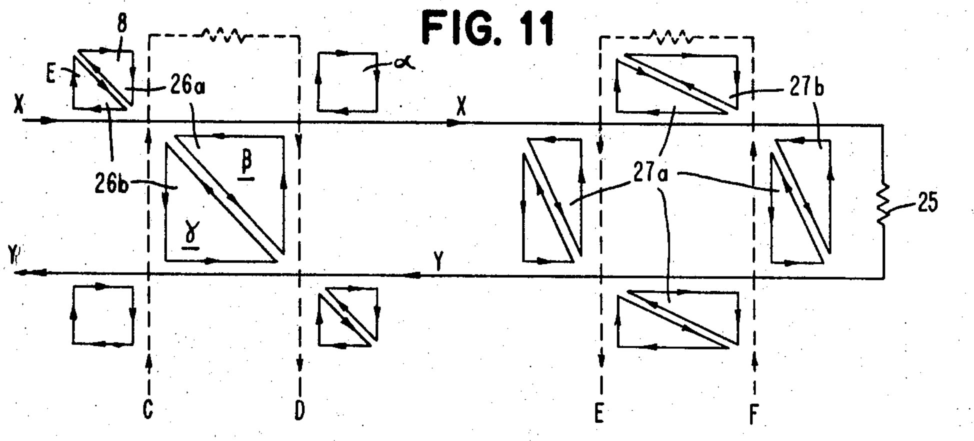
FIGURE 11 illustrates the current paths for the 0 and 1 patterns in the unbalanced capacitive coupling embodiment.
Figure 12:
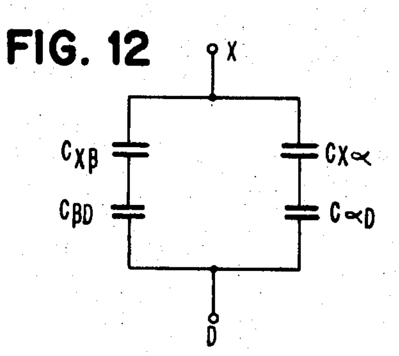
FIGURES 12 and 13 show schematically the capacitances between one of the drive conductors and the two sense conductors respectively of FIGURE 10.
Figure 13:
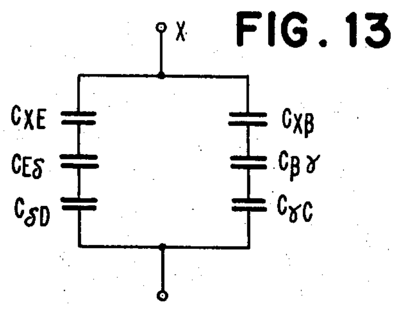

The pattern of coupling conductors shown in FIGURE 11 as cross pattern 26 may represent a binary 1 and the pattern of coupling conductors shown in FIGURE 11 as naught pattern 27 may represent a binary 0.

The total absence of any coupling conductors at any location may be used to represent a third digit or bit.

The arrangement of coupling conductors between drive and sense conductors is inductive and capacitive for both FIGURES 10 and 11. Consider first the inductive coupling; assume a current is applied to the drive conductors X and Y in the direction of the arrows (FIGURE 11). A current is induced in the coupling conductors 26 and 27 in the direction of the arrows, generating a flux field which, by Lenz' law, tends to oppose the field produced by the current in the drive conductors. The current in the coupling conductors in turn induces an electromotive force in the sense conductors C and D in the direction of the arrows. Thus when the current in XY increases in the direction shown C becomes positive with respect to D. The increasing current in XY is accompanied by an increasing voltage across the resistor 25, X becoming positive with respect to Y.

Consider now the capacitive coupling: with selected coupling conductors slotted from corner to corner (FIGURE 11) the capacitance between conductors X and D is made up from four capacitances (FIGURE 12), Capacitance $C_X\beta$ in series with $C\beta_D$, is connected together in parallel with $C_{X\alpha}$ in series with $C\alpha_D$. The capacitance between X and C is made up of six capacitances, (FIGURE 13) viz. $C_{X\epsilon}$ in series with $C\epsilon_\delta$ and $C_{\delta C}$, connected together in parallel with $CX\beta$ in series with $C_{\beta\delta}$ and $C_{\delta C}$. From the geometry of this arrangement:

$$C_{X\epsilon}=C_{X\alpha}$$
$$C_{\delta C}=C_{\alpha D}$$
$$C\beta_D=C_{\delta C}$$

Thus the capacitances between X and D and X and C are equal except for the presence of the capacitance $C_{\epsilon\delta}$ and $C_{\beta X}$ introduced by the slots. Since the corner to corner slots ensure that the capacitances $C_{\epsilon\delta}$ and $C_{\beta X}$ are finite, the capacitance between X and D exceeds that between X and C. Consequently the time constant associated with the capacitive coupling between X and D is greater than the time constant associated with the capacitive coupling between X and C. Similarly, the capacitive coupling between Y and C exceeds that between Y and D. When X becomes positive with respect to Y the unbalanced capacitive couplings between X and C and D and between Y and C and D, cause C to become positive with respect to D. The inductive coupling also causes C to become positive with respect to D and the capactive coupling therefore exhances the inductive coupling. A distinctive output signal is obtained across the sense conductors CD.

Following a similar arrangement in the case of the coupling between drive conductors XY and sense conductors EF (FIGURE 10), the corner to corner slots in the coupling conductors 27 causes the capacitance between X and E to exceed that between X and F and causes the capacitance between Y and F to exceed that between Y and E. Thus, when X becomes positive with respect to Y the unbalanced capacitive coupling causes E to become positive with respect to F thus enhancing the E.M.F. induced in the sense conductors EF by the coupling conductors.

To store binary information, the two digits, e.g. 1 and 0, may be represented respectively by the patterns of coupling conductors 26 and 27 shown in FIGURE 10.

To store ternary information, the three digits, e.g. 1, 0 and −1, may be represented respectively by pattern 26 of coupling conductors shown in FIGURE 10, no pattern and pattern 27 shown in FIGURE 10.

Figure 14:
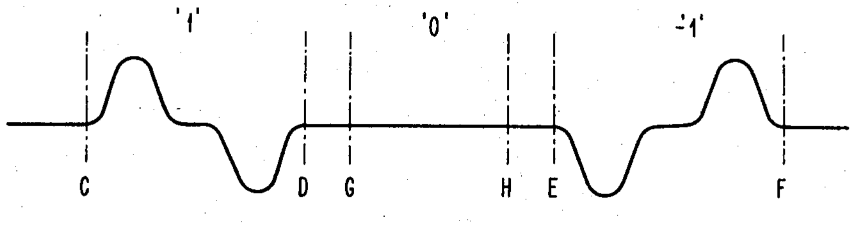
FIGURE 14 is an example of an output pattern on sense conductors CD, GH, EF of FIGURE 10.

FIGURE 14 shows a typical output pattern obtained from a sense amplifier connected across sense conductors CD, GH, or EF (FIGURE 10). When a positive-going change is produced in the drive current in the drive conductors XY a positive pulse in the sense conductors results and the subsequent negative-going change of drive current produces a negative pulse in the sense conductors CD to indicate a 1 is stored. No pulse in sense conductors GH indicates a zero stored, and a negative pulse followed by a positive pulse in sense conductors FF to indicate −1 is stored.

Figure 15:
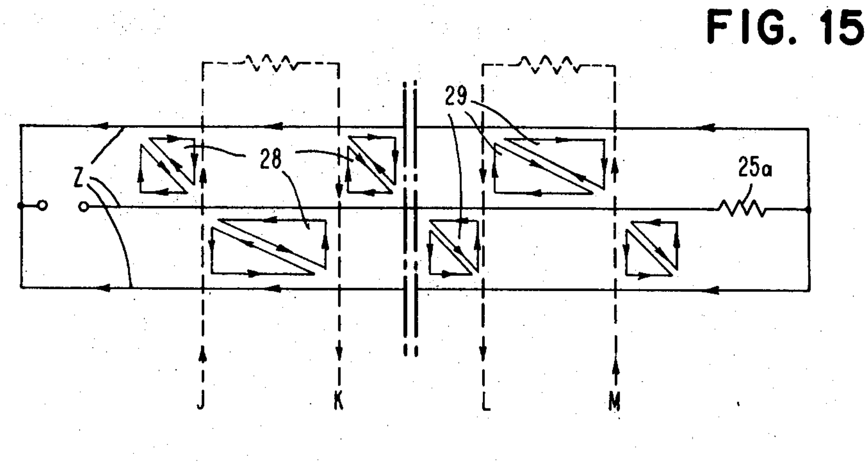
FIGURE 15 shows an alternative coupling conductor pattern for use with an unbalanced arrangement of drive conductors.

FIGURE 15 shows an alternative arrangement of coupling conductor patterns 28, 29 for storing a 1 and a 0 or a −1 respectively as the case may be, for use with asymmetrical drive conductors Z and balanced sense conductors JK, LM. In this arrangement all the coupling conductors are split diagonally from corner to corner to enhance the inductive coupling in a similar manner to that described above with reference to FIGURES 10 and 11. A current pulse flowing in drive conductor Z in the direction of the arrows, induces a voltage output in the pair of sense conductors JK, indicative of a 1 stored and in sense conductors LM, indicative of a 0 or −1 stored. Termination resistors such as 25*a* are employed for the same reasons described above with reference to FIGURE 10.

Figure 16:
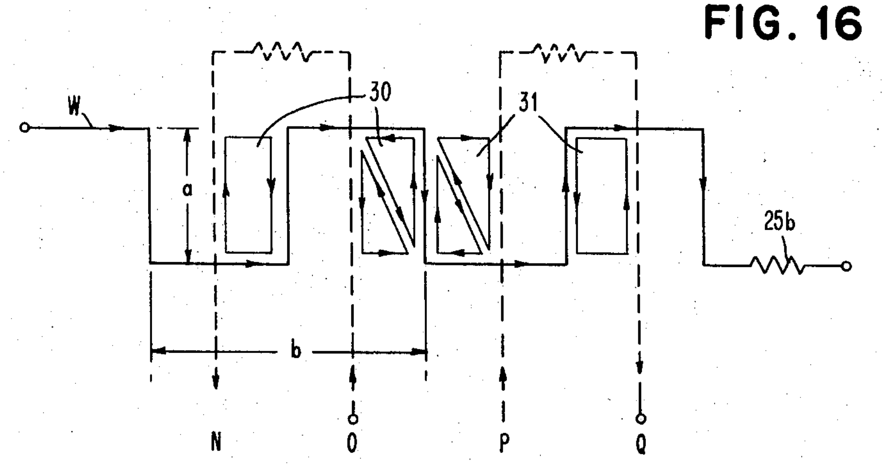
FIGURE 16 shows a further coupling conductor configuration for use with an unbalanced arrangement of drive conductors.

FIGURE 16 shows an alternative coupling conductor configuration 30, 31 for use with an unbalanced arrangement in which only one drive conductor W is employed. For a given area available to store one digit of information, given conductor width, given drive conductor input pulse and given separation of the drive and sense conductors, the coupling conductor configuration of FIGURE 16 is capable of giving a larger output signal than that of FIGURE 15. The output signal on sense conductors NO and PQ tends to increase with increase in the ratio of dimension *a* to be until *b* falls below about six times the conductor width. In FIGURE 16, the pattern of conductors 30 may be used to represent a 1 and the pattern of conductors 31 to represent a 0. The directions of currents flow are represented by arrows.

The memory array described above may be subject to various modifications. For example, the sets of drive and sense conductors may not be printed on but may be bonded to the sheet or board of insulating material. Furthermore the sets of pairs of drive and sense conductors may extend in directions inclined to one another.

The coupling conductors are also subject to modification; for example, the direction of the slots shown in FIGURES 10, 11, 15 and 16 is not to be considered limitative as other configurations are possible, which by introducing an unbalanced capacitive coupling will enhance the inductive coupling between the drive and sense conductors. The coupling conductors may further either be printed on the sheet or board 22 or on a separate sheet or board of electrically insulating material which is placed adjacent the board 22. The coupling conductors may also take the form of closed printed conductors.

Figure 17:
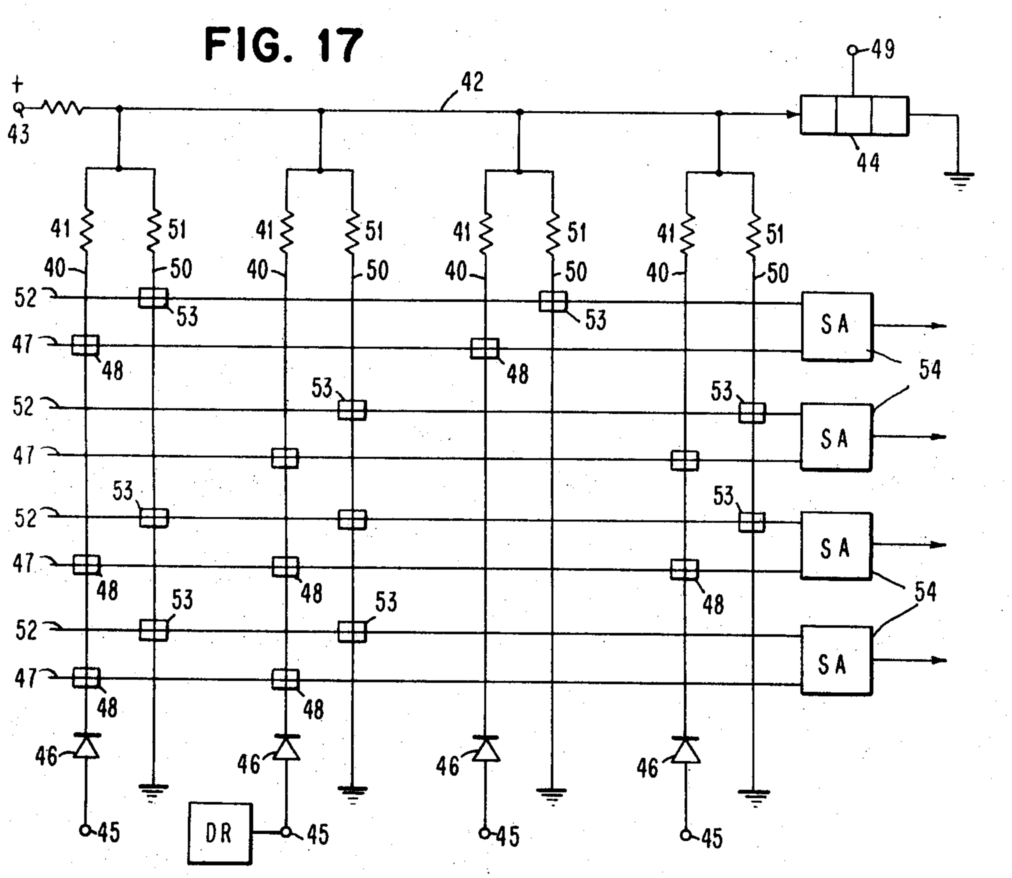
FIGURE 17 shows schematically a data translating apparatus comprising an interconnected conductor system having balanced drive conductors connected to be driven by transistor drive circuits and connected to supply output signals through a series of differential sense amplifiers.
Figure 18:
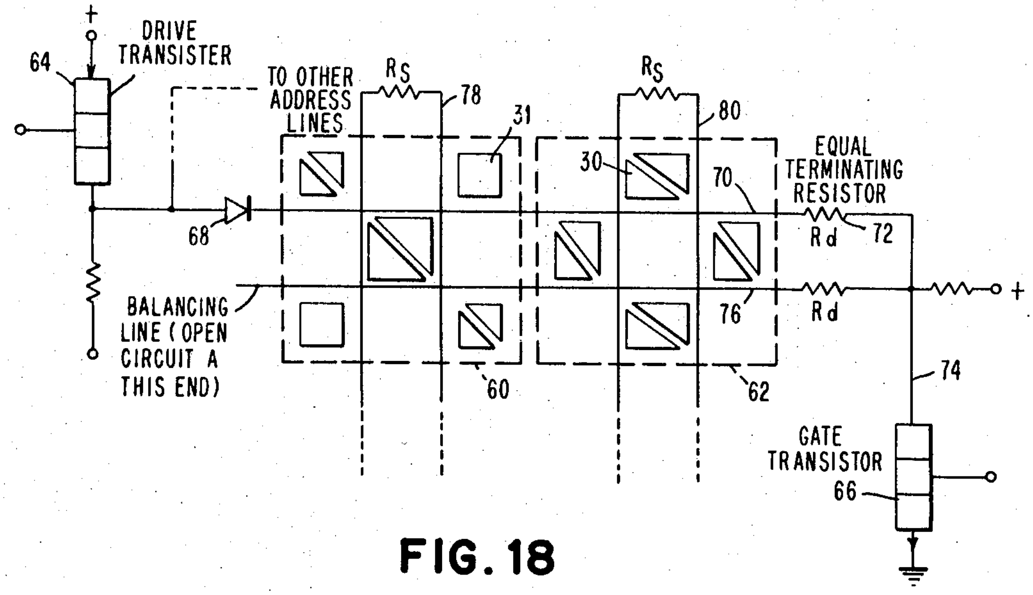
FIGURE 18 shows a portion of a data translating apparatus incorporating the transistor drive circuit of FIGURE 17 with a different balanced drive conductor.

*Balanced system—FIGS. 17 and 18*

In the balanced system, gating elements are connected to the ends of the address conductors remote from the ends connected to the pulse generator, whereby unselected conductors present an open-ended characteristic to the pulse generator. The apparatus further comprises a set of balance conductors lying adjacent said first set of conductors and which are open-ended at ends adjacent gating elements and which also are connected at the opposite ends to the pulse generator. A set of sense conductors is interconnected both to the first set of conductors and the set of balance conductors by connections which, regardless of the form of said predetermined pattern, are influenced equally by pulses applied to a balance conductor and its associated drive conductor when this latter conductor is not selected.

FIGURE 17 shows an array of sixteen storage locations at each of which a pair of sense conductors is intersected by a pair of conductors, one of which is a drive conductor and the other a drive balancing conductor.

There are four drive conductors 40 which are connected through resistors 41 to a common line 42 joining a positive potential supply 43 and the collector of a switching transistor 44. The drive conductors are gated by the application of positive pulses to terminals 45 to which the conductors are connected by diodes 46 as shown. The sense conductors 47 are capacitatively coupled to the drive conductors 40 selectively by capacitors 48. The configuration of capacitors at the matrix intersection points determines the binary data (0, or 1) stored in the system. Thus, to read out a binary word stored in one column of the matrix a drive conductor 40 is gated by applying a positive potential (less than that of the supply 43) to the corresponding terminal 45 so that when transistor 44 is switched on by applying a pulsed signal to the base terminal 49 a current is drawn through the diode 46 of the selected drive line. This current generates pulses in each capacitatively coupled sense conductors 47 to supply, in parallel, output signals along the sense conductors representing a binary word stored in the system. Diodes 46 of the nonselected drive lines prevent current from being supplied along the other drive conductors from supply 43 but do not prevent the line surge occurring down each conductors when the transistor is driven conductive; the capacitive couplings in the other effectively open-ended lines absorb some current. For this reason, the drive balancing conductors 50 are provided. These lines are open-ended adjacent the diode couplings of the conductors 40 but connected through resistors 51, equal to the resistances of resistors 41, to the common line 42. Also, these conductors 50 are capacitatively coupled selectively to sense conductors 52 by capacitors 53, there being such a capacitative coupling only at the matrix intersections corresponding to the locations of capacitors 48. The output signals from the sense conductors 47 and 52 are derived through differential amplifiers 54 connected as shown to supply signals determined by the difference of potential on lines 47 and 52.

In operation, when transistor 44 is pulsed conductive, a voltage surge travels along each pair of drive lines. Thus, if a drive conductor 40 is not gated (not selected) the diode 45 is seen as open-end to the drive line and the line characteristic is identical to that of the associated drive balancing conductor 50. This means that the contribution to the signals induced in the sense lines is equal and no resultant output is supplied by the differential amplifiers. However, in regard to the drive conductor 40, which is gated to conduct, a stronger surge will pass along this line which is not balanced by that along its associated drive balancing conductor 50 and a stored word will be read out through the differential amplifiers 54.

FIGURE 18 shows a single row in a capacitive read-only-memory embodying the invention comprising two memory positions 30 and 31 of a read-only-memory. One position stores a one-bit and the other stores a zero-bit. Each memory position comprises a pattern of sheets of conducting material such as copper placed at the intersection of an address line 70 and a sense line 78. The pattern of the sheets of conducting material is such that in position 30 when an address current appears in line 70 a potential which is indicative of a "1" is induced in the sense line 78 and may be recognized by a sense amplifier (not shown) and the pattern of sheets of conducting material in position 31 is such that a potential indicative of "0" is induced in the sense line 80. The memory positions are addressed by coincidence of selection of a drive transistor 64 and a gate transistor 66. The coupling between the driver transistor 64 and the gate transistor 66 includes a diode 68, and address line 70, a resistor 72 and a column line 74. In order to counter balance any spurious inductive or capacitive coupling between the address lines and the sense lines, a balance address line 76 is provided which has the same characteristic as the address line 70, but, however, the coupling between the balance address line and the sense line is arranged to be in the opposite sense to the coupling between the address line 70 and the sense lines. Thus, when the gate transistor 66 is switched on the potential of each leg of the sense line, lines 78 and 80, changes by the same amount due to capacitive coupling and the electromotive force induced by the current flowing the balancing line is equal and opposite to that induced by the current flowing in the address line. Thus there will be no potential difference on the sense line terminals due to any straight capacitive or inductive coupling. When the driver transistor is subsequently switched on only the address line carries current and undergoes a change in potential. A normal sense line signal then results.

While the invention has been particularly shown and described with reference to preferred embodiments thereof, it will be understood by those skilled in the art that various changes in form and details may be made therein without departing from the spirit and scope of the invention.

What is claimed is:

1. A matrix read-only memory for multi-bit words, comprising:
   (a) a multiplicity of bit storage patterns arranged in a first coordinate and second coordinate;
   (b) a pair of sense conductors for each first coordinate traversing the patterns for a particular bit order of each of a plurality of words;
   (c) a differential sense amplifier for each first coordinate, connected across said pair of sense conductors;
   (d) a drive conductor and a balance conductor for each second coordinate, traversing the bit storage patterns for a particular multi-bit word from a drive end to a terminating end; and
   (e) driver means connected to said drive conductors at the drive end.

2. A matrix read-only memory according to claim 1, wherein the balance conductors are connected to a source of reference potential at the drive end.

3. A matrix read-only memory according to claim 2, wherein the drive conductors and balance conductors terminate via equal resistances through a common gate.

4. A matrix read-only memory according to claim 1, wherein the balance conductors are open circuits at the drive end.

5. A matrix read-only memory according to claim 4, wherein the drive conductors and balance conductors terminate.

6. A matrix read-only memory according to claim 1 in which said bit storage patterns comprise conductive elements establishing significant capacitance between said drive and balance conductors and sense conductors at intersections of the matrix.

7. A matrix read-only memory according to claim 6 in which said bit storage patterns comprise a conductive element capacitively coupling one of said drive conductors to one of said sense conductors according to the data being stored and a conductive element coupling the other of said drive conductors to the other of said sense conductors.

8. A matrix read-only memory according to claim 7 in which groups of said drive conductors are coupled to a common one of said driver means whereby energizing a selected one of said drive conductors causes capacitively coupled noise to appear on said sense conductors according to the data representing patterns of said drive conductors coupled to said selected drive conductor, and corresponding groups of said balance conductors are coupled to said driver to provide capacitively coupled voltages on said sense conductors compensating for the noise produced by said drive conductors.

9. A matrix read-only memory according to claim 8 in which said drive conductors are connected to said driver means at one end and one of said drive conductors of each pair is connected at its other end to gate means whereby a selected one of said first coordinates receives a read signal and others of said coordinates receive balanced capacitively coupled noise voltages.

10. A matrix read-only memory comprising:

(a) pairs of sense wires for each first coordinate corresponding to a particular bit order of each of a plurality of words;

(b) a drive wire for each second coordinate, corresponding to a word of the memory; and means to energize a selected drive wire to read a word of the memory;

(c) first conductive plates located at the intersection of each drive wire and a selected one of the pair of sense wires for each bit order of each word and conductively connected to one of said conductors to capacitively couple the associated drive wire and one sense wire;

(d) differential sensing means for each first coordinate coupled to receive signals on the associated pair of sense wires and operable to produce an output signifying data according to a difference in said signals;

(e) and second conductive plates located at each bit position and conductively interconnected to capacitively couple the one of said sense wires that is not coupled to the drive wire at the particular bit position to a point of potential to establish equal capacitance on each half of each sense wire pair.

11. A matrix read only memory according to claim 10 including means conductively interconnecting said second conductive plates along said second coordinate.

References Cited

UNITED STATES PATENTS

| | | | |
|---|---|---|---|
| 3,102,999 | 9/1963 | Bernemy | 340—173 |
| 3,130,388 | 4/1964 | Renard | 340—173 |
| 3,231,875 | 1/1966 | Ishidate | 340—173 |
| 3,253,267 | 5/1966 | Ishidate | 340—173 |

TERRELL W. FEARS, *Primary Examiner.*

BERNARD KONICK, *Examiner.*